United States Patent [19]

Friend

[11] Patent Number: 5,112,541
[45] Date of Patent: May 12, 1992

[54] MICROENCAPSULATED LUBRICATING FLUIDS AND ADDITIVES AND METHOD OF MAKING SAME

[75] Inventor: David R. Friend, Menlo Park, Calif.

[73] Assignee: Idemitsu Kosan Company, Ltd., Tokyo, Japan

[21] Appl. No.: 150,056

[22] Filed: Jan. 29, 1988

[51] Int. Cl.⁵ .................. B01J 13/18; B01J 13/02
[52] U.S. Cl. ............................ 264/4.7; 264/4.1
[58] Field of Search .................. 264/4.7, 4.1

[56] References Cited

U.S. PATENT DOCUMENTS

| | | | |
|---|---|---|---|
| 3,429,827 | 2/1969 | Ruus | 264/4.7 X |
| 3,516,846 | 6/1970 | Matson | 264/4.7 X |
| 3,778,383 | 12/1973 | Schibler et al. | 264/4.7 |
| 3,844,816 | 10/1974 | Vassiliades et al. | 264/4.7 |
| 4,303,548 | 12/1981 | Shimazaki et al. | 264/4.7 |
| 4,396,670 | 8/1983 | Sinclair | 264/4.7 X |
| 4,460,722 | 7/1984 | Igarashi et al. | 264/4.7 X |
| 4,489,017 | 12/1984 | Alberts et al. | 264/4.7 X |
| 4,608,330 | 8/1986 | Marabella | 428/402.22 X |
| 4,610,927 | 9/1986 | Igarashi et al. | 264/4.7 X |

FOREIGN PATENT DOCUMENTS 132631 10/1980 Japan .................. 264/4.1
204035 10/1986 Japan .................. 264/4.7

*Primary Examiner*—Robert L. Stoll
*Assistant Examiner*—John M. Covert
*Attorney, Agent, or Firm*—Koda and Androlia

[57] ABSTRACT

Microencapsulating lubricating fluids and additives and a method of preparing microencapsulated lubricants including the steps of preparing an emulsification medium, adding a lubricant to the emulsification medium, emulsifying the emulsification medium and lubricant to form an emulsion, adding a first solution including resorcinol and dimethylol urea to the emulsion, acidifying the first solution and emulsion, adding a second solution consisting of resorcinol and dimethylol urea to the acidified first solution and emulsion while vigorously stirring it to form a microcapsule suspension, adjusting the pH to be basic, filtering and washing the microcapsule suspension to separate the microcapsules from the solution, and drying the microcapsules.

1 Claim, 1 Drawing Sheet

FIG. I
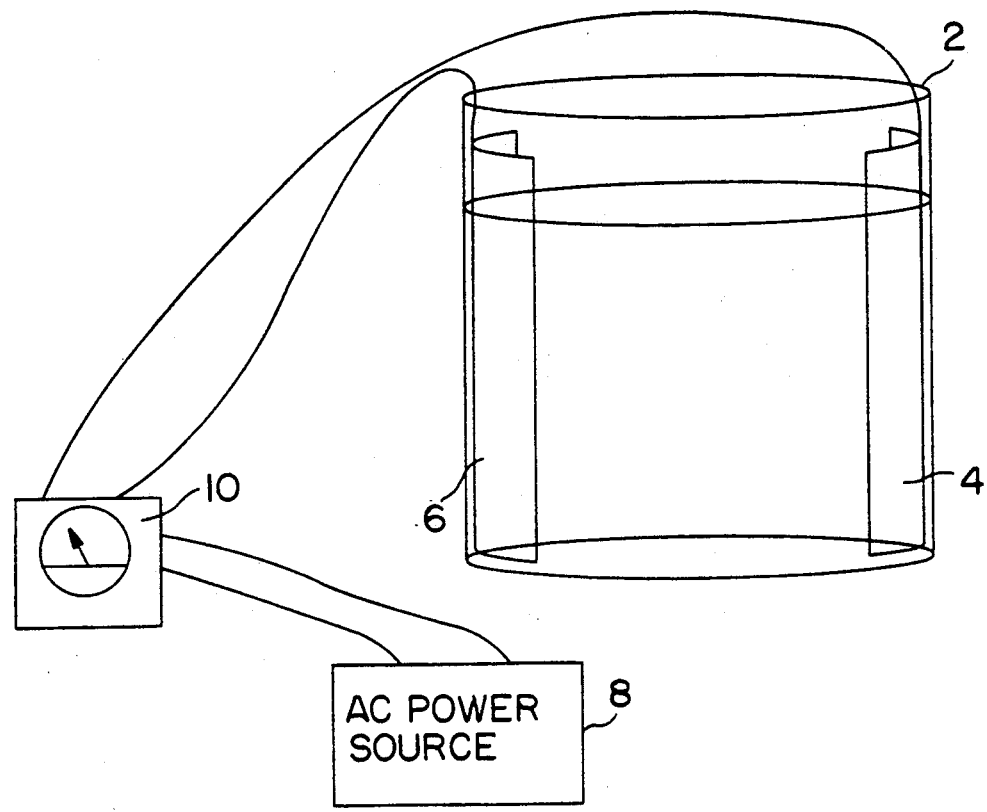
FIG. 2
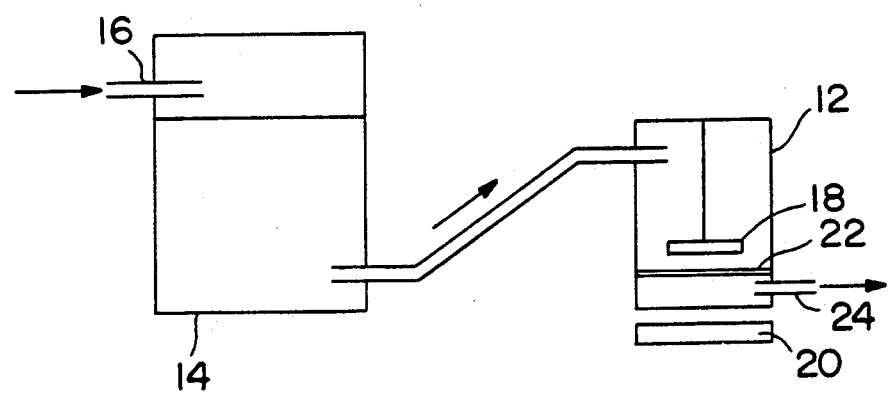

5,112,541

MICROENCAPSULATED LUBRICATING FLUIDS AND ADDITIVES AND METHOD OF MAKING SAME

BACKGROUND OF THE INVENTION

1. Field of the Invention

This invention relates to microencapsulation and particularly to microencapsulated lubricating fluids and their additives for controlled release and a method of making same.

2. Prior Art

In the prior art there exist methods for micro-encapsulation. Such methods are utilized to microencapsulate several different liquids; however, the prior art methods of microencapsulation have certain difficulties in that the micro-encapsulation produces microcapsules of irregular shape, of inconsistent wall thickness, clumping of the microcapsules which are too large and of low yields of microcapsules.

Examples of methods for microencapsulation of various products are shown in U.S. Pat. No. 3,886,084; U.S. Pat. No. 4,273,672; U.S. Pat. No. 4,495,509; U.S. Pat. No. 4,525,520 and U.S. Pat. No. 4,599,271.

SUMMARY OF THE INVENTION

Accordingly, it is a general object of the present invention to produce microcapsules which are regular in shape, have a consistent and desirable wall thickness, have a high yield, are small in size and do not clump together.

It is another object of the present invention to produce microencapsulated lubricants by a method which is reliable, repeatable and not complex or high in cost.

In keeping with the principles of the present invention, the objects are accomplished by a unique method of preparing microencapsulated lubricants including the ordered steps of preparing an emulsification medium including an emulsion stabilizer and a surfactant, adding a lubricant to the emulsification medium, stirring the emulsification medium and lubricant, emulsifying the emulsification medium and lubricant to form an emulsion, mixing together resorcinol and dimethylol urea to form a first solution, adding the first solution to the emulsion while vigorously stirring the emulsion, acidifying the first solution and emulsion, mixing together resorcinol and dimethylol urea to form a second solution, adding the second solution to the acidified first solution and emulsion while vigorously stirring to form a microcapsule suspension, adjusting the pH of the microcapsule suspension to be basic, filtering and washing the microcapsule suspension and drying the microcapsules.

BRIEF DESCRIPTION OF THE DRAWINGS

The above-mentioned features and objects of the present invention will become more apparent with reference to the following description taken in conjunction with the accompanying drawings wherein like reference numerals denote like elements and in which:

FIG. 1 illustrates a method for dissolving the polyvinyl alcohol emulsion stabilizer in water; and FIG. 2 illustrates an apparatus for filtering the microcapsule suspension.

DETAILED DESCRIPTION OF THE INVENTION

The method of microencapsulating lubricants of the present invention starts by preparing an emulsification medium. The emulsification medium comprises an emulsion stabilizer and a surfactant. Suitable emulsion stabilizers are polyvinyl alcohol such as ViNOL 125 or 540 made by Air Products, cellulose ether such as METHOCELL E5 by Dow Chemical and polyethers. The polyvinyl alcohol is made by hydrolyzing polyvinyl acetate while the cellulose ether is made by reacting methyl chloride with propylene oxide.

Suitable surfactants are sodium dodecyl sulfate, ETHOQUAD C/25, Methylpolyoxyethylene (15)-oleylammonium chloride made by Armour Industrial Chemical Company, PLURONICS $(O(CH_2CH_2O)_a$—$(CH(CH_3)CH_2O)_b$—$(CH_2(H_2O)_cH)$ made by BASF, ABEX (anionic surfactant) JKB made by Alcolac, albumen and gelatin.

To make the emulsification medium, first the emulsion stabilizer is dissolved in water. In particular, sufficient emulsion stabilizer is dissolved in water to make a 0.1 to 10 % weight to volume concentration solution and preferably 1 to 5 %. The cellulose ether is readily dissolvable in water; however, the polyvinyl alcohol is not. Accordingly, the polyvinyl alcohol is dissolved in water by means of the apparatus shown in FIG. 1. In particular, the polyvinyl alcohol together with the water is placed in the container 2. Electrodes 4 and 6 are provided in the container 2. A source of AC power 8 is connected respectively to the electrodes 4 and 6 and an amp meter 10 is provided in line to measure the current. Generally, a current in amount of 1.0 to 1.5 amps is applied. Thus, the polyvinyl alcohol is dissolved in the water in a relatively short time (less than 30 minutes).

To the emulsion stabilizer is added a 1 to 10 % weight to volume concentration of surfactant. The preferred range is 2 to 4 % weight to volume concentration and the preferred surfactant is sodium dodecyl sulfate, while the preferred emulsion stabilizer is polyvinyl alcohol.

To about 50 ml of the emulsification medium is added the lubricant or lubricating additive. Suitable lubricants and additives are oleic acid, mineral oil, synthetic and other oil soluble lubricant additives. If oleic acid is added, 10 to 20 gr of oleic are added to the 50 ml of emulsification medium. If mineral oil is utilized, 7 to 12 gr of mineral oil are added to the 50 ml of emulsification medium.

Next the emulsification medium with lubricant is emulsified utilizing a probe-sonicator such as one made by Wave Energy Systems and this step is performed for approximately 3 to 5 minutes in an ice bath to prevent heat build up.

The emulsified emulsification medium and lubricant are transferred to a wide mouth Erlemeyer flask fitted with a high speed mechanical propeller-type stirrer Next, a first solution is prepared which comprises a mixture of resorcinol and dimethylol urea. If oleic acid is being utilized, the resorcinol is added in an amount of 0.84 to 1.68 gr and the dimethylol urea is added in an amount of 15 to 30 ml of a 15 to 20 % weight to volume concentration. Alternately, if mineral oil is utilized resorcinol in an amount of 0.08 to 0.84 gr and dimethylol urea in an amount of 15 to 25 ml of 15 to 20 % weight to volume concentration are utilized. Also, melamine could be added to the solution in a suitable amount.

While the emulsification medium and lubricant are being vigorously stirred (at approximately 3500 rpm) in the wide mouth flask, the first solution is added dropwise to the emulsion. Then, the contents of the wide mouth flask are slowly acidified by dropwise adding a 10 % weight to volume concentration of sulfuric acid solution to cause the pH to be lower than 7. Next, a second solution is prepared comprising a mixture of resorcinol and dimethylol urea. Again, if oleic acid is utilized, resorcinol in an amount of 0.764 to 1.28 gr and dimethylol urea in an amount of 10 to 22 ml of a 15 to 20 % weight to volume solution is utilized. If mineral oil is utilized, resorcinol in an amount of 0.06 to 0.64 gr and dimethylol urea in amount of 10 to 20 ml of a 15 to 20 % weight to volume concentration solution is utilized.

After approximately one hour from the addition of the sulfuric acid to the contents of the wide mouth flask, the second solution is added dropwise thereto while being vigorously stirred. After an additional hour, the pH is adjusted to be basic (to be higher than 7 and approximately 7.5 pH) by adding concentrated sodium hydroxide and then by gently stirring the suspension contained in the wide mouth flask it is allowed to come to room temperature.

The contents of the wide mouth flask are poured into the filtration chamber 12 of the ultra filtration apparatus shown in FIG. 2. The ultra filtration apparatus shown in FIG. 2 further comprises a pressurized chamber 14 into which approximately two liters of water are provided Pressurized air is provided into the port 16 in the pressurized chamber 14 and the water is forced in the filtration chamber 12 which contains the microencapsulated suspension. The chamber 12 is provided with a stir bar 18, a stirrer 20, a filter 22 and an exhaust port 24. The pore size of the filter is approximately 0.45 μm and the microencapsulated suspension is washed by the distilled water passing therethrough while being stirred by the stir bar 18. The distilled water together with any residue exits the filtration chamber by way of the exhaust port 24.

The microcapsules are then sprayed dried in a commercially available spray dryer such as a Yamamoto Pulvis Basic Unit Model GB-21 with the conditions set as follows:

| | |
|---|---|
| Air Pressure: | 2.0 kg/cm$^2$ |
| Inlet Temperature: | 1.30° C. |
| Outlet Temperature: | 65° C. |
| Aspirator Setting: | 8 |
| Liquid Flow Rate: | 10 ml per minute |

After spray drying, the encapsulation is completed.

While the above method has been described in terms of using dimethylol urea and resorcinol, it would also be possible to prepare the microcapsules using polyurethane or a precondensate of urea/form-aldehyde and melamine. Furthermore, the melamine itself can be selected from the group consisting of amine compounds and aldehyde. A brief description of an example of how this method would be performed is given below.

First, 48.9 ml of 37 % concentration formaldehyde is mixed with 18 gr of urea and 3 gr of melamine. The mixture is heated to 70° C. for one hour and the pH adjusted to 8 with triethanolamine followed by the addition of 100 ml of water. The solution is allowed to cool to room temperature. Added thereto is 10 gr of oleic acid to 50 ml of 5 % polyvinyl alcohol containing 4 % sodium dodecyl sulfate. The resultant is emulsified with a magnetic stir bar and then sonicated for three minutes while keeping the solution cool with an ice bath. The solution is transferred to a wide mouth flask and stirred rapidly with a mechanical stirrer. Added thereto is 20 ml of the precondensate solution followed by the dropwise addition of 2.0 ml of 10 % sulfuric acid solution. The temperature is then raised to 50° C. while continuing the rapid stirring. After 45 minutes, an additional 10 to 50 ml of water are added to thin the suspension. The temperature is allowed to cool to room temperature and the reaction continued for an additional approximate three hours. The pH is adjusted to be basic (7.5 pH) utilizing concentrated sodium hydroxide. The suspension is poured into a filtration chamber of an ultra filtration apparatus and as previously described above and the suspension is washed. The microencapsulated suspension is then spray dried utilizing a spray drier such as that described above.

Utilizing the method described above, microencapsulated lubricants such as oleic acid and mineral oil can be reliably and repeatedly microencapsulated and microcapsules can be created which have a regular shape, consistent wall thickness, do not clump significantly and which have a high yield. In addition, microcapsules with a size as small as from as 0.5 to 10μm to as large as 50 μm and preferably 0.5 to 5 μm can be made.

It should be apparent to those skilled in the art that the above described embodiments are merely illustrative of but a few of the many specific embodiments employing the principles and objects of the present invention. Numerous and varied other arrangements can be readily devised by those skilled in the art without departing from the spirit and the scope of the invention.

I claim:

1. A method of preparing microencapsulated lubricants and lubricant additives consisting of the ordered steps of:

preparing an emulsion stabilizer by dissolving polyvinyl alcohol in water by applying an AC power field to a mixture of polyvinyl alcohol and water;

preparing an emulsification medium including said emulsion stabilizer and a surfactant;

adding a core material selected from eh group consisting of lubricants and oil soluble lubricating additives to the emulsification medium;

stirring the emulsification medium and lubricant;

emulsifying the emulsification medium and lubricant to form an emulsion;

mixing together resorcinol and dimethylol aurea to form a first solution;

adding the first solution to the emulsion while vigorously stirring the emulsion;

acidifying the first solution and emulsion;

mixing together resorcinol and dimethylol urea to form a second solution;

adding the second solution to the acidified first solution and emulsion while vigorously stirring to form a microcapsule suspension;

adjusting a pH of the microcapsule suspension to be basic;

filtering and washing the microcapsule suspension to separate microcapsules form any residue of the first and second solutions; and drying the microcapsules.

* * * * *